Aug. 21, 1962  J. L. BUTLER ET AL  3,049,934
ELECTRICALLY ASSISTED MANUAL GEAR SHIFT MEANS
Filed Jan. 27, 1961  2 Sheets-Sheet 1
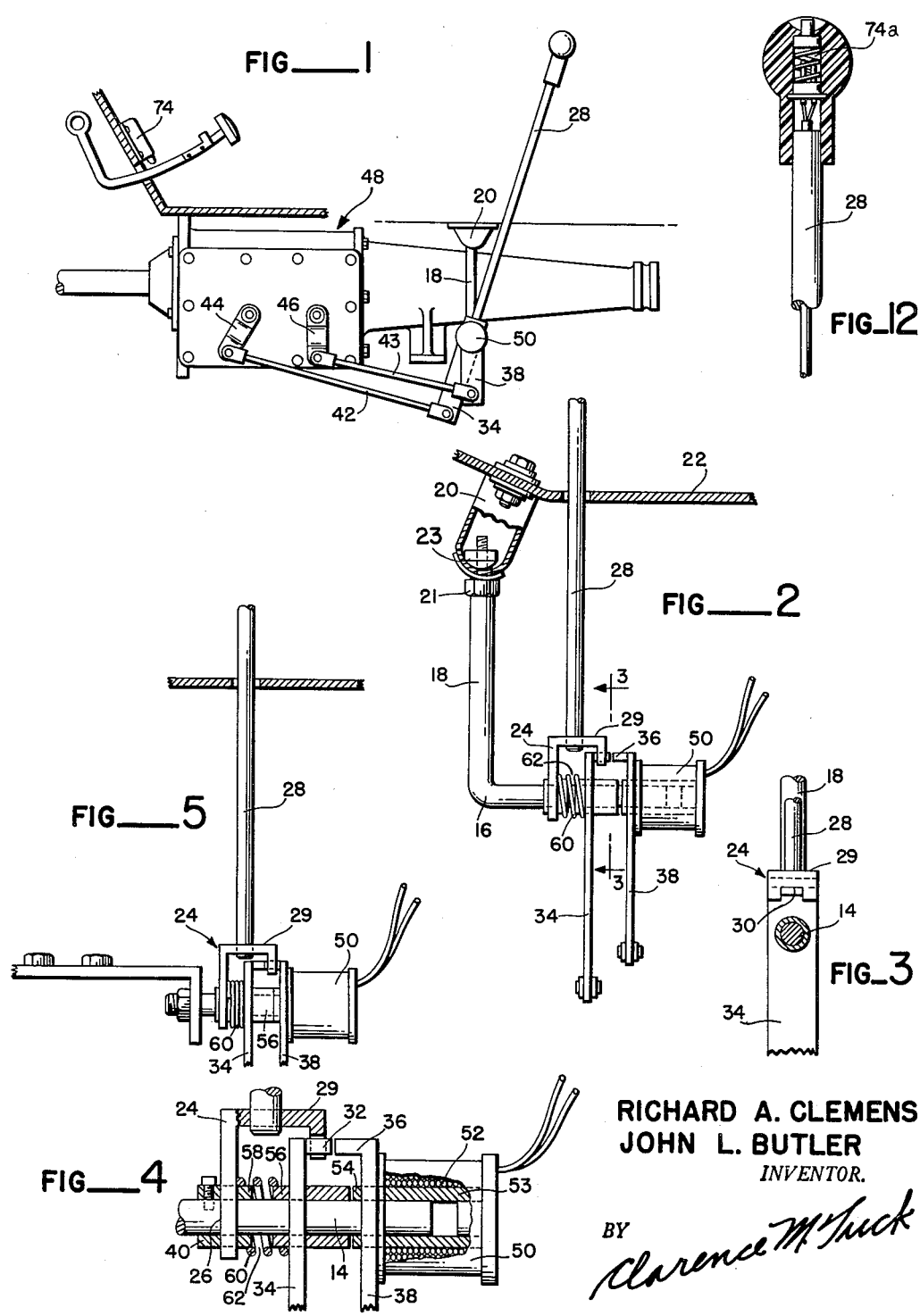
RICHARD A. CLEMENS
JOHN L. BUTLER
*INVENTOR.*

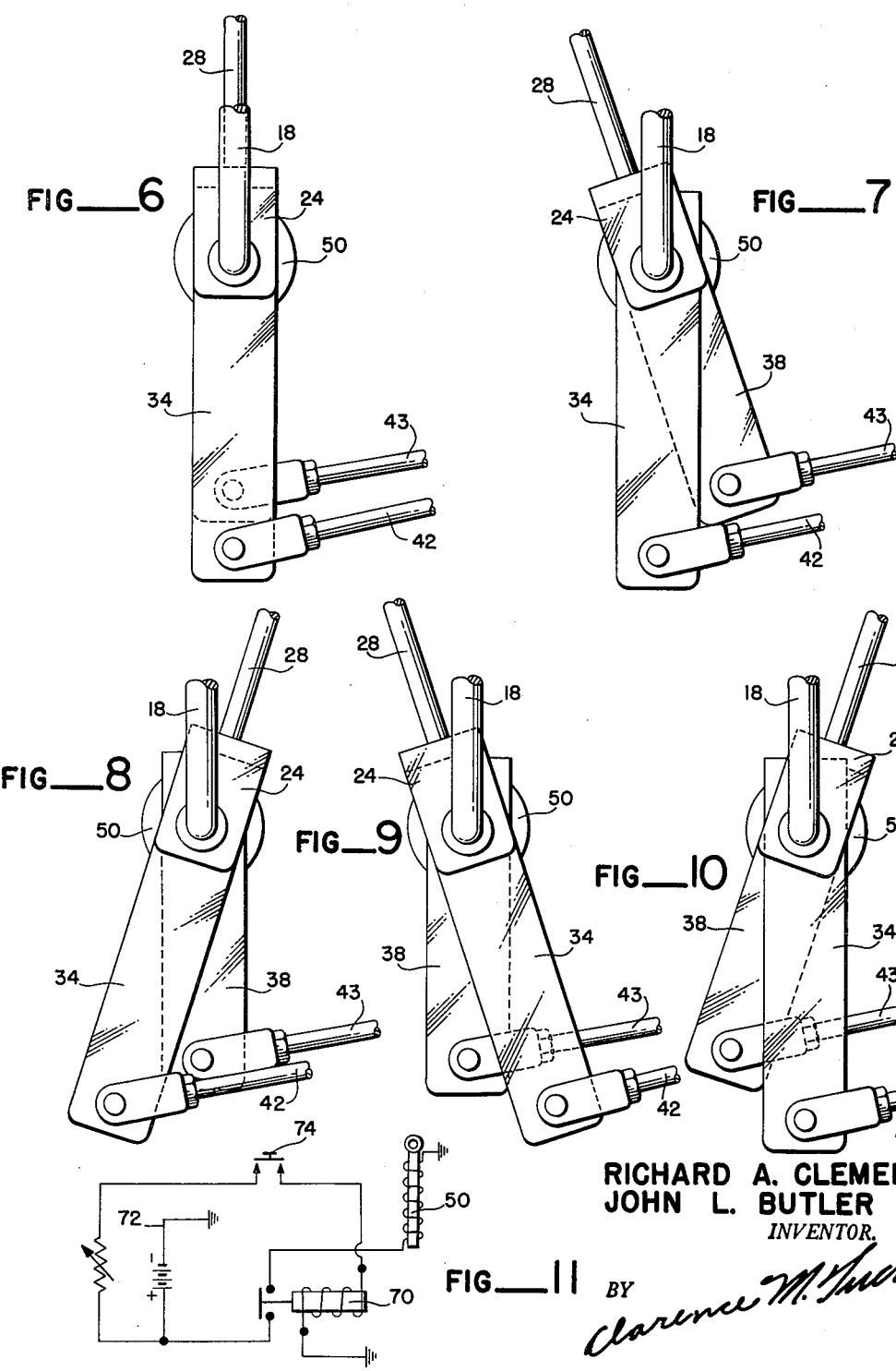

United States Patent Office
3,049,934
Patented Aug. 21, 1962

1

3,049,934
ELECTRICALLY ASSISTED MANUAL GEAR SHIFT MEANS
John L. Butler, Rte. 3, Box 570, Anacortes, Wash., and Richard A. Clemens, 1234 E. 98th St., Seattle, Wash.
Filed Jan. 27, 1961, Ser. No. 85,232
7 Claims. (Cl. 74—335)

This present invention relates to the general art of means employed for shifting change gear transmissions of the type employed in automobiles and in other industrial uses where quick shifting of gears is desirable. More particularly, this invention relates to a gear shifting means which will control a three speed transmission with reverse, and wherein the usual H plate shift directing means is replaced with a straight fore and aft movement of the shift lever and in which the selective mechanism controls which movable gears are to be engaged.

In the shifting of gears in change speed transmissions of the so-called manual type, reliance in the past has been placed upon an H plate, which required and directed a transverse movement of the gear shift lever in order to change from one movable gear or gear cluster to another which was to be shifted in the transmission to give the desired speed ratio. Previously after the transverse shift had been made to select the movable member in the transmission, the movement then was forward or aft in accordance with the speed desired. With the technological improvement particularly in the automotive type of internal combustion engines, a very flexible motor has been produced but the manual shifting of the transmission gearing of the conventional type has caused an appreciable time loss or lag in the shift from one speed to another. This loss of time in the shift is very objectionable because it disconnects the motive power from the transmission for an appreciable period of time in which the car has a chance to decelerate causing an objectionable change in speed of the vehicle which is very noticeable to the occupants. This general condition has led to the widespread adoption of the automatic transmission wherein a complicated mechanism is provided which will make the necessary shifting movement quicker than the average person can shift the usual H plate transmission arrangement. However this involves an increased purchase cost initially as well as the maintenance of the automatic transmission. Additionally the driver loses positive control of his car and has a mechanism that imposes its will upon him. Our present transmission shifting and control means returns to the simplicity of the manual shift transmission with its few parts, no maintenance, and when the teachings of this present invention are followed a very positive control is provided. Further the shifting time has been greatly reduced as there is no transverse movement of the shift lever, the movement being merely forward and back with the selector mechanism being operated electrically by means of a movable solenoid coil. It is therefore believed that we have made a practical solution of a very perplexing problem.

The principal object of our present invention, therefore is to provide a simple means for shifting a conventional three speed forward and reverse transmission that can be applied to the conventional transmission as mounted in an automobile by means so simple that it can be easily and inexpensively installed.

A further object of this invention is to provide a straight line gear shift means in which an electrical selecting means for the gears to be shifted is substituted for the former mechanism which required the transverse movement of the gear shift lever.

A further object of this invention is to provide a gear shifting means that can be easily applied to the conventional automotive or industrial transmission and which will greatly reduce the gear shifting time so that a smooth flow of power is maintained from the engine to the driven member such as the rear axle of an automobile or the work spindle of a machine tool.

Further objects, advantages and capabilities will be apparent from the description and disclosure in the drawings, or may be comprehended or are inherent in the device.

In the drawings:

FIGURE 1 is a side elevation of a typical manual type transmission and illustrating the placement of our control means with respect thereto.

FIGURE 2 is a transverse sectional view through our gear shifting means as it is normally applied to an automobile.

FIGURE 3 is a fragmentary cross-sectional view taken along the lines 3—3 of FIGURE 2.

FIGURE 4 is a transverse view, partly in section, illustrating the solenoid and its mounting and the members which it moves.

FIGURE 5 is a fragmentary view taken in the same sense as FIGURE 2 but illustrating a different form of solenoid shaft and a modified bracket therefor, which is desirable for mounting of the shifting mechanism on certain types of automobiles.

FIGURE 6 is a side elevation showing our shift in its neutral position.

FIGURE 7 is a side elevation taken in the same sense as FIGURE 6 but illustrating our shifting parts with the portion controlling the first speed and reverse being shown in the operating position corresponding with reverse.

FIGURE 8 is shown in the position of the shift bars and shift lever when third speed is engaged.

FIGURE 9 is a side elevation illustrating the position of the shift bars or the second speed.

FIGURE 10 is a side elevation illustrating the position of the shift bars to achieve the first speed.

FIGURE 11 is a wiring diagram illustrating diagrammatically a preferred arrangement of the electrical circuit in our movable gear selector.

FIGURE 12 illustrates a modified form of electrical switch for controlling the solenoid and which is capable of being more easily installed on certain types of cars and industrial machines. A more intimate control of the transmission shift means is provided.

Referring to the drawings throughout which like reference characters indicate like parts, the reference character 14 designates the solenoid shaft. This shaft is transversely disposed with respect to the automobile on which this mechanism is mounted and is fixedly positioned by the means illustrated in FIGURES 1, 2 and 5. A preferred arrangement is to have the solenoid shaft bent at 16 to give an upwardly extending portion 18, the upper end of which is fixedly secured in the bracket 20, providing a limited degree of aligning capability, so that when the device is installed in a car it is self-aligning and can then be secured in this aligned position as by the lock nut 21. Bracket 20 is preferably secured to the metal plate 22 forming the top of the transmission tunnel as in FIGURE 2 or may be secured to the transmission case as in FIGURE 5. The bracket 20 is provided with a semi-spherical bottom having an opening larger then the turned down end of shaft extension 18 to permit limited alignment adjustment. The interior nut 23 has a semi-spherical form for coaction with the slotted bottom of bracket 20.

Operatively disposed on solenoid shaft 14 are the elements making up the gear selector means. One element is the shift selector yoke 24, which has one vertically disposed leg having the opening or bearing 26, which encircles the solenoid shaft and positions the lower end of the shift selector yoke, and the lower end of the shift lever 28, which is preferably secured to the horizontal portion 29 of the selector yoke 24. The shifter yoke has a downwardly extending portion which is bifurcated to form the rectangular notch 30, as is illustrated in FIGURE 3. This notch is disposed to be selectively engaged by the shift lugs 32 or 36 which are horizontally disposed and are provided at the upper ends of the two shift bars. Shift lug 32 being formed as part of the second and high shift bar 34 and shift lug 36 formed as part of the first speed and reverse shift bar 38. The shift selector yoke 24 is prevented from moving to the left, as viewed in FIGURE 4, by the set collar 40. This collar is fixedly secured to shaft 14 against which the downwardly extending leg of the shift selector yoke 24 engages and is capable of limited movement around shaft 14.

Disposed also on solenoid shaft 14, are the two shift bars 34 and 38. These bars are free to partially revolve on shaft 14 but have their general angular position determined by the shift rods attached to them, as 42 and 43, which shift rods in turn are pivotably secured to the operating arms 44 and 46, which are operatively secured to and form the operating means for the mechanism shifting the movable gears or gear clusters of the transmission. The transmission is indicated generally by the reference character 48. Also disposed on shaft 14 is the solenoid 50. Solenoid 50 employs the solenoid shaft 14 as its reactance core and as the core is fixedly positioned by brackets 20 and 23, the electrical energy, when applied to the coil 52, moves the coil and its housing which is provided with means limiting its axial movement along shaft 14, to be described later. The operating arms 44 and 46 in coaction with shift rods 42 and 43 provide a means for angularly positioning the shift bars 34 and 38 on shaft 14 when the shift bars are not operatively engaged by yoke 24.

Coil 52 is disposed upon a central sleeve 53, which sleeve preferably passes through shift bar 38 to provide the engaging abutment 54. Shift bar 34 is fixedly secured to a second sleeve 56 and the unit thus formed is slidably mounted on shaft 14. Sleeve 56 extends through shift bar 34 to provide an annular abutment which is disposed to engage the abutment 58 which forms part of the stop collar 40 in a preferred arrangement. Attention is invited to the fact that there should be a sufficient gap or spacing between abutments 56 and 58, as is indicated at 62, so that lug 32 can be entirely withdrawn from notch 30 as the shift bar 34 moves to the left as viewed. This movement is resisted by the biasing spring 60. It is essential that lug 32 be capable of being moved entirely out of notch 30 so that lug 36 can be fully engaged therein when it becomes desirable to make a shift involving either first speed or reverse.

The functioning of the gear selector means as illustrated in FIGURE 4 is provided by solenoid 50 which when energized moves its coil and coil supporting means as a unit to the left, as viewed, carrying with it shift bar 38 and shift lug 36. When this movement to the left starts, abutment 54 engages sleeve portion 56 disposed on the right side of shift bar 34 as viewed in FIGURES 4 and 5 and thus moves the shift bar 34 to the left as viewed, compressing the biasing spring 60. As soon as solenoid 50 is disconnected from its electrical energy source biasing spring 60 restores the parts to the position indicated in FIGURE 4. Sleeve 56 and abutment 54 provide a spacing and actuating means to prevent the shift lugs 32 and 36 actually touching and enables the longitudinal movement of shift bars 34 and 38 to the left as viewed in FIGURE 5 by solenoid coil 52 and the retrograde movement under spring bias of spring 60 when the solenoid coil 52 is de-energized.

Equipment of this order must be reasonably adaptable for installation on a wide range of automobiles and also be capable of being applied to many industrial machines, particularly machine tools. As previously noted the operator has only two movements that he can make with the shift lever 28 and that is to move it forward or rearward from the central or neutral position. Once a shift has been made to one of the forward speeds or to the reverse, our shifting gear selector mechanism will normally hold it in that position due to the fact that the biasing spring 60 is of such substantial character and tends to press against the parts in cooperation with the solenoid to hold the parts in fixed position. Neither the solenoid 50 nor spring 60 have any facility for rotating the elements; consequently there should be no change in the speed or lever position selected. The various positions of the two shift bars 34 and 38 are illustrated in FIGURES 6 through 10 inclusive. As presently arranged this shifting of bar 34 to the third, neutral or second positions can be accomplished by merely moving shifter lever 28 forward or rearwardly from the neutral central position. However, since machines are normally started in low gear this means the engagement of shift bar 38, through its shift lug 36, with yoke 24.

Because of the biasing of spring 60 it is necessary that the solenoid 50 be energized and this is achieved preferably by means of an electric solenoid switch 70. This switch has the function of handling a considerable current at the relatively low voltages of the car battery 72; consequently it is normally positioned close to the solenoid and is triggered or in turn operated by the primary switch 74, which may be equipped with lighter wire because of the lesser amperage of current required. The primary switch may be mounted in any convenient position and two such positions have been illustrated. A preferred mounting is to place the primary switch 74 where it can be engaged by the clutch pedal at the extreme end or slightly beyond the end of the throw required to disengage the clutch. Such an arrangement is illustrated in FIGURE 1. An alternate position that is very practical in certain installations and particularly in industrial usage, is to mount the switch 74a on or at the end of the operating shifting lever 28. Here it is manually controllable and such an arrangement is often desirable, particularly in trucks and tractors and the like. However, considering the employment of the preferred form as noted, the electrical switch is mounted in such a way that when the clutch pedal is depressed to its maximum and a little extra pressure is exerted, an electrical connection is made through solenoid switch 70 which actuates the solenoid 50 on the shifting mechanism. The solenoid moves the low and reverse actuating arm 38 in such a position that when the shift lever is moved from low to second, and the shift lever passes neutral, the spring pressure quickly moves the first speed and reverse shift lug 36 out of notch 30 and engages the second and high actuating arm 34 shifting lug 32. If a shift is made from second to third or from third to second, a solenoid 50 should not be energized, and this can be provided for by merely operating the clutch sufficiently to disengage it without applying the extra pressure required to move the pedal far enough to engage primary switch 74.

It is believed that it will be clearly apparent from the above description and the disclosure in the drawings that the invention comprehends a novel construction of an electrically assisted manual gear shift means.

Having thus disclosed our invention, we claim:

1. An electrically assisted manual gear shift means for a change speed gear transmission comprising: a horizontally disposed solenoid shaft; means for fixedly securing one end of said shaft; a gear selector means operably disposed on said shaft for selecting the movable gear required to effect a given gear change; said selector means comprising a shift selector yoke revolvably mounted on said shaft, having means to prevent it from moving longitudinally of said shaft and having a downwardly extending portion which is bifurcated to provide a lug receiving opening; a second and third speed shift bar revolvable and slidable on said solenoid shaft and having a shift lug adapted to selectively engage said lug receiving opening; a compression spring encircling said shaft and biasing said second and third speed shift bar to move toward said downward extending portion of said shift selector yoke, a first speed and reverse shift bar slidably and revolvably disposed on said solenoid shaft and having a shift lug disposed to selectively engage said lug receiving opening, spacing abutment and sleeve means providing a spacing means for said shift bars to prevent side engagement between said shift lugs, a solenoid coil slidably disposed on said solenoid shaft and adapted to use said shaft as a reactance core and move said first speed and reverse shift bar toward said selector when electric current is applied to said coil, said coil being returned to its de-energized position when the electric current is interrupted, by said compression spring; a source of electric current for operating said coil and switch means for controlling said current application to said coil; a manually operated shift lever for operating said selector yoke and shift rods operatively connecting said shift bars to said transmission.

2. The combination according to claim 1 further provided with a self-aligning bracket means for positioning one end of said solenoid shaft and having coacting nuts for securing said shaft and said bracket in adjusted fixed engagement.

3. An electrically assisted manual gear shift means for a change speed transmission, comprising: a solenoid shaft and means for securing said shaft in operating position; a gear selector means comprising a shift selector yoke revolvably mounted on said shaft; means to prevent said yoke from moving longitudinally of said shaft and having a downwardly extending portion in which is provided a lug receiving opening; a second and third speed shift bar revolvable and slidable on said solenoid shaft and having a shift lug adapted to selectively engage said lug receiving opening, a compression spring encircling said shaft and biasing said second and third speed shift bar toward said lug receiving opening; a first speed and reverse shift bar slidably and revolvably disposed on said solenoid shaft and having a shift lug disposed to selectively engage said lug receiving opening; spacing means for said shift bars to prevent side engagement between said shift lugs; a solenoid coil slidably disposed on said solenoid shaft and adapted to use said shaft as a reactance core and move said first speed and reverse shift bar toward said selector yoke against said spring bias when electric current is applied to said coil; a source of electric current for operating said coil and switch means for controlling said current application; a manually operated shift lever for operating said selector yoke and shift rods operatively connecting said shift bars to said transmission.

4. The combination according to claim 3 wherein said selector yoke, said second and third speed shift bar and said first speed and reverse shift bar are revolvably mounted in order on said solenoid shaft, said biasing spring is disposed between said shifter yoke and said second and third speed shift bar to urge said second and third speed shift lug into engagement with said lug receiving opening of said shifter yoke.

5. The combination according to claim 4 further provided with spacing means between said second and third speed shift bar and said first speed and reverse shift bar which space said shift bars with their shift lugs in substantially abutting relationship as they are moved longitudinally of said solenoid shaft when under spring bias or under a moving force supplied by said solenoid coil.

6. The combination according to claim 5 further provided with operating arms for operatively engaging the movable gears of a change gear transmission; shifter rods operatively connecting said operating arms and said shift bars and thus providing means for angularly positioning said shift bars on said solenoid shaft during the periods said shift bars are positioned respectively by said solenoid and said biasing spring.

7. The combination according to claim 4 further provided with a central sleeve, forming part of said slidably disposed solenoid coil, having an engaging abutment; a second sleeve portion fixedly secured to said second and high shift bar; said engaging abutment and said second sleeve slidably disposed on said solenoid shaft between said second and third speed shift bar and said first speed and reverse shift bar and spacing said shift bars so that their shift lugs will be in substantially abutting relationship as they are moved longitudinally of said solenoid shaft when under spring bias or under a moving force supplied by said solenoid coil.

References Cited in the file of this patent

UNITED STATES PATENTS

| | | |
|---|---|---|
| 2,601,629 | Price | June 24, 1952 |
| 2,617,311 | Miller | Nov. 11, 1952 |
| 2,922,315 | Primeau | Jan. 26, 1960 |
| 2,961,890 | Marshall | Nov. 29, 1960 |